(12) United States Patent
Gajadevasangary et al.

(10) Patent No.: US 8,422,062 B2
(45) Date of Patent: Apr. 16, 2013

(54) APPARATUS AND METHOD FOR FACSIMILE TRANSMISSION CONFIGURATION

(75) Inventors: Sahadevasangary Gajadevasangary, Stevenage (GB); Maysara Fermawi, Borehamwood (GB); Martin Roantree, Brookmans Park (GB); Joanna Keep, Stevenage (GB)

(73) Assignee: Xerox Corporation, Norwalk, CT (US)

( * ) Notice: Subject to any disclaimer, the term of this patent is extended or adjusted under 35 U.S.C. 154(b) by 451 days.

(21) Appl. No.: 12/776,775

(22) Filed: May 10, 2010

(65) Prior Publication Data

US 2011/0273747 A1 Nov. 10, 2011

(51) Int. Cl.
*G06F 3/12* (2006.01)
*H04N 1/32* (2006.01)
*H04M 11/00* (2006.01)

(52) U.S. Cl.
USPC ............... 358/1.15; 358/442; 379/100.01

(58) Field of Classification Search ............... 358/1.15, 358/1.13, 442, 444, 468, 434, 407, 425; 379/100.01, 379/100.171, 90.1
See application file for complete search history.

(56) References Cited

U.S. PATENT DOCUMENTS

| | | | |
|---|---|---|---|
| 6,437,870 B1* | 8/2002 | Yoshida et al. | 358/1.15 |
| 6,577,715 B1* | 6/2003 | Atsuta | 379/100.17 |
| 6,757,367 B1* | 6/2004 | Nicol | 379/90.01 |
| 6,819,750 B1* | 11/2004 | Mehta et al. | 379/100.17 |
| 7,148,982 B2 | 12/2006 | Terao | |
| 7,359,370 B1* | 4/2008 | Renkel et al. | 370/352 |
| 7,471,779 B2 | 12/2008 | Kajiwara | |
| 2001/0033642 A1* | 10/2001 | Abrishami et al. | 379/100.01 |
| 2002/0087370 A1* | 7/2002 | Brueckheimer et al. | 705/7 |
| 2002/0114017 A1* | 8/2002 | Ono et al. | 358/426.04 |
| 2003/0123466 A1* | 7/2003 | Somekh et al. | 370/401 |
| 2005/0168785 A1* | 8/2005 | Garakani et al. | 358/434 |
| 2006/0067301 A1* | 3/2006 | Fruth et al. | 370/352 |
| 2007/0165269 A1* | 7/2007 | Kimoto | 358/1.15 |
| 2007/0223053 A1* | 9/2007 | Jin | 358/439 |
| 2009/0028168 A1* | 1/2009 | Somekh et al. | 370/401 |
| 2009/0051965 A1* | 2/2009 | Inoishi | 358/1.15 |
| 2011/0051924 A1* | 3/2011 | LeBlanc et al. | 379/406.06 |
| 2011/0134914 A1* | 6/2011 | Wasiel et al. | 370/353 |

* cited by examiner

*Primary Examiner* — Madelein A Nguyen
(74) *Attorney, Agent, or Firm* — Ronald E. Prass, Jr.; Prass LLP

(57) ABSTRACT

An apparatus and method that configures a facsimile transmission protocol for a facsimile device is disclosed. The method can include transmitting an echo request via a network connection to a facsimile device. The method can include receiving a response to the echo request via the network connection from the facsimile device. The method can include determining network throughput impairments based on the received response to the echo request. The method can include adjusting a facsimile transmission protocol based on the determined network throughput impairments. The method can include transmitting a facsimile message based on the adjusted facsimile transmission protocol.

16 Claims, 3 Drawing Sheets

APPARATUS AND METHOD FOR FACSIMILE TRANSMISSION CONFIGURATION

BACKGROUND

Disclosed herein is an apparatus and method that configures a facsimile transmission protocol for a facsimile device.

Presently, when an internet aware facsimile device is configured to operate over an Internet Protocol (IP) packet based network, there are two options for the configuration. The first configuration uses a fax pass through protocol, such as pulse code modulation. Fax pass through is comparatively high speed, but has a high sensitivity to IP impairments. These impairments include packet loss, delay, and jitter, bandwidth impairments, and other impairments, which can cause call failure. The second configuration is a T38 protocol. T38 is more robust to network impairments and results in a successful call, but is low speed when compared to fax pass through.

Unfortunately, while users prefer a higher speed transmission for their facsimile communications, the higher speed fax pass through protocol is unreliable for IP facsimile communications. Thus, most IP networks must use the T38 configuration for facsimile communications. This results in user dissatisfaction as T38 facsimile communications are slower than pass through communications, which upsets user workflow as users migrate from public switched telephone networks to IP networks.

Thus, there is a need for an apparatus and method that configures a facsimile transmission protocol for a facsimile device.

SUMMARY

An apparatus and method that configures a facsimile transmission protocol for a facsimile device is disclosed. The method can include transmitting an echo request via a network connection to a facsimile device. The method can include receiving a response to the echo request via the network connection from the facsimile device. The method can include determining network throughput impairments based on the received response to the echo request. The method can include adjusting a facsimile transmission protocol based on the determined network throughput impairments. The method can include transmitting a facsimile message based on the adjusted facsimile transmission protocol.

BRIEF DESCRIPTION OF THE DRAWINGS

In order to describe the manner in which advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
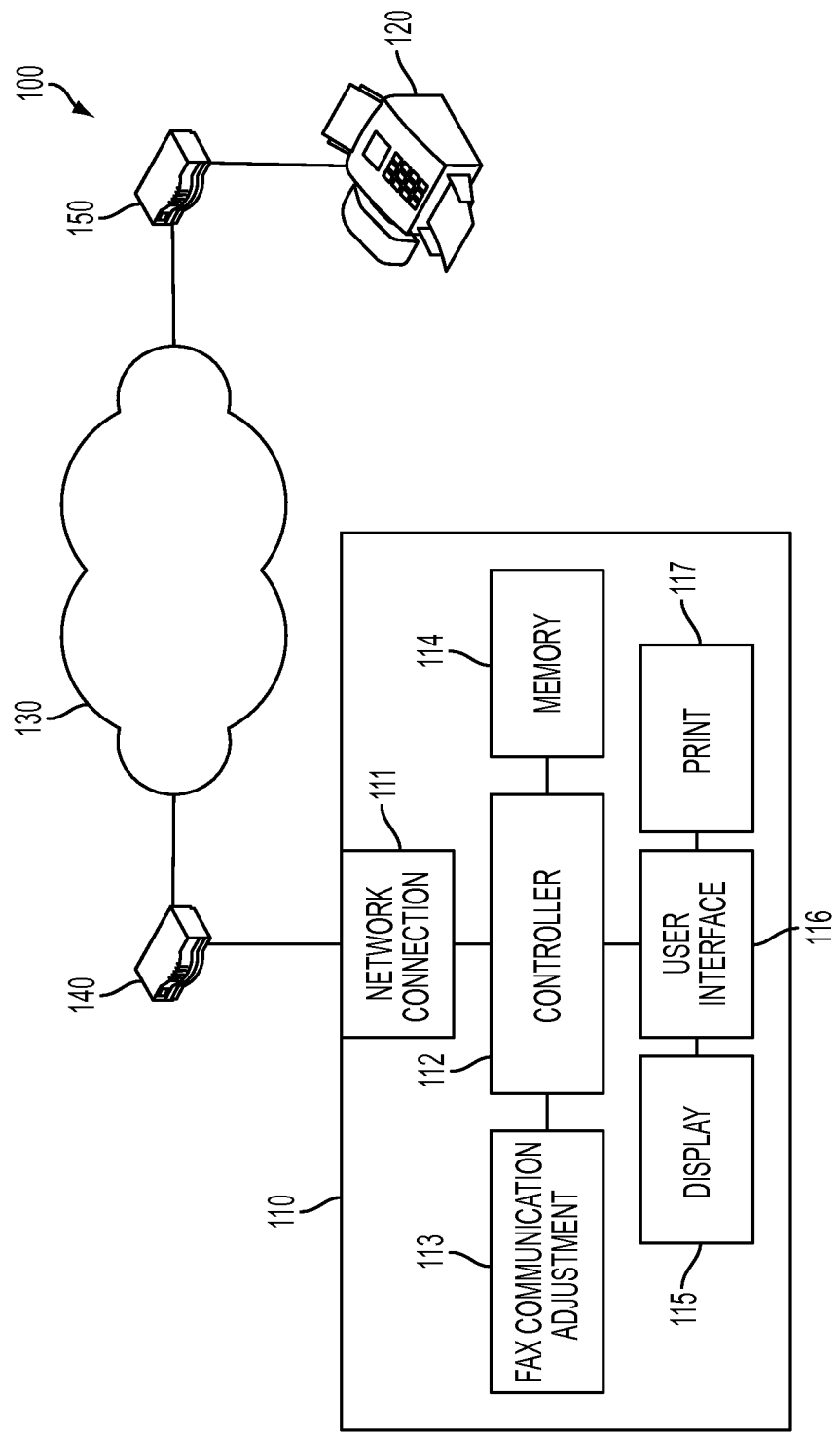
FIG. 1 is an exemplary illustration of a system including an internet aware facsimile device.

The embodiments include a method of configuring a facsimile transmission protocol in an internet aware facsimile device having a network connection and a facsimile device controller. The method can include transmitting an echo request via the network connection to another facsimile device. The method can include receiving a response to the echo request via the network connection from the another facsimile device. The method can include determining network throughput impairments based on the received response to the echo request. The method can include adjusting a facsimile transmission protocol based on the determined network throughput impairments. The method can include transmitting a facsimile message based on the adjusted facsimile transmission protocol.

The embodiments further include an apparatus for configuring a facsimile transmission protocol. The apparatus can include a network connection. The apparatus can include a facsimile device controller configured to control operations of the apparatus and configured to send and receive communications over the network connection. The apparatus can include a facsimile communication adjustment module configured to transmit an echo request over the network connection to another facsimile device, configured to receive a response to the echo request via the network connection from the another facsimile device, configured to determine network throughput impairments based on the received response to the echo request, and configured to adjust a facsimile transmission protocol based on the determined network throughput impairments. The facsimile device controller can be configured to transmit a facsimile message based on the adjusted facsimile transmission protocol.

The embodiments further include a method of configuring a facsimile transmission protocol in an internet aware source facsimile device including a network connection configured to send and receive packet data and a facsimile device controller. The method can include transmitting an internet information request message via the network connection to a target facsimile device. The method can include receiving a response to the internet information request message via the network connection from the target facsimile device. The method can include measuring network throughput impairments based on the received response to the internet information request message. The method can include comparing the measured network throughput impairments to a threshold. The method can include implementing a faster facsimile transmission protocol if the network throughput impairments are substantially below the threshold and implementing a slower and more robust facsimile transmission protocol relative to the faster facsimile transmission protocol if the network throughput impairments are substantially above the threshold. The method can include transmitting a facsimile message to the target facsimile device based on the implemented facsimile transmission protocol over the connection configured to send and receive packet data.

FIG. 1 is an exemplary illustration of a system 100 including a first internet aware facsimile device 110, a second internet aware facsimile device 120, a network 130, a first router 140, and a second router 150. The network 130 can be any type of network that can transmit packetized data. The facsimile device 110 can include a network connection 111. The network connection 111 can be a wireless or a wired network connection. For example, the network connection 111 can be a network interface connection for internet protocol facsimile communications, a local area network connection, an Ethernet connection, a WiFi connection, an 802.11 wireless transceiver, a cellular transceiver, a connection configured to send and receive packet data, or any other connection that can connect a device to a packet network. The facsimile device 110 can include a facsimile device controller 112 configured to control operations of the facsimile device 110 and configured to send and receive communications over the network connection 111. The facsimile device 110 can include a memory 114. The memory 114 may include a random access memory, a read only memory, an optical memory, a hard drive, a detachable universal serial bus memory, or any other memory that can be coupled to a facsimile device. The memory 114 can also include a computer readable medium including a computer-usable data carrier storing instructions for implementing the methods disclosed herein.

The facsimile device 110 can include a facsimile communication adjustment module 113. The facsimile communication adjustment module 113 can be coupled to the controller 112, can reside within the controller 112, can reside within the memory 114, can be an autonomous module, can be software, can be hardware, or can be in any other format useful for a module on a facsimile device.

The facsimile communication adjustment module 113 can be configured to transmit an echo request over the network connection 111 to a target facsimile device, such as the facsimile device 120. The echo request can be an internet information request message or any other message used to ping another device. The facsimile communication adjustment module 113 can be configured to receive a response to the echo request via the network connection 111 from the target facsimile device. The facsimile communication adjustment module 113 can be configured to determine network throughput impairments based on the received response to the echo request. The facsimile communication adjustment module 113 can be configured to adjust a facsimile transmission protocol based on the determined network throughput impairments. The facsimile device controller 112 can then transmit a facsimile message based on the adjusted facsimile transmission protocol.

The facsimile communication adjustment module 113 can be configured to compare the determined network throughput impairments to a threshold and can be configured to adjust the facsimile transmission protocol based on comparing the determined network throughput impairments to the threshold. The facsimile communication adjustment module 113 can adjust the facsimile transmission protocol by implementing a faster facsimile transmission protocol if the network throughput impairments are substantially below the threshold and by implementing a slower and more robust facsimile transmission protocol relative to the faster facsimile transmission protocol if the network throughput impairments are substantially above the threshold. The faster facsimile transmission protocol can be a facsimile pass through transmission protocol and the slower and more robust facsimile transmission protocol can be a T38 facsimile transmission protocol. The facsimile communication adjustment module 113 can default the facsimile transmission protocol to a T38 facsimile transmission protocol unless the determined network throughput impairments are substantially below the threshold. The term "substantially" used herein with respect to "above" and "below" indicates the terms may include the threshold. Thus, either impairment measurements substantially above a threshold or impairment measurements substantially below the threshold may include the threshold value.

The facsimile communication adjustment module 113 can compare the determined network throughput impairments to a first threshold and compare the determined network throughput impairments to a second threshold, where the second threshold is above the first threshold. The facsimile communication adjustment module 113 can then adjust the facsimile transmission protocol by implementing a higher speed facsimile transmission protocol if the network throughput impairments are substantially below the first threshold, by implementing a first lower speed facsimile transmission protocol slower and more robust than the higher speed facsimile transmission protocol if the network throughput impairments are substantially above the first threshold and substantially below the second threshold, and by implementing a second lower speed facsimile transmission protocol more robust than the first lower speed facsimile transmission protocol if the network throughput impairments are substantially above the second threshold.

The facsimile device 110 can include a display 115. The display 115 can be a liquid crystal display (LCD), a light emitting diode (LED) display, a plasma display, or any other means for displaying information. The facsimile device 110 can include a user interface 116. The user interface 116 can include a keypad, buttons, a touch pad, a joystick, an additional display, or any other device useful for providing an interface between a user and an electronic device. The facsimile device 110 can include a print module 117. The print module 117 can generate an image, such as a facsimile transmission report, a received facsimile communication, or any other image, on media.

Embodiments provide an automatic configuration of an internet aware facsimile device by dynamically adopting the facsimile communication protocol to the current network impairment level. During a high level of impairments, the internet aware facsimile device can self-configure for T38 facsimile communications. When the impairments on the network drop to an appropriate level, the internet aware facsimile device can reconfigure itself for facsimile pass through communications. In this manner, most facsimile calls can go through at a high speed and some calls can go through at a low speed rather than all calls going through at the low speed. The internet aware facsimile device can also self-configure the facsimile communication protocol to match available bandwidth. Thus, the internet aware facsimile device can typically use T.38 facsimile communications and, when the network has more bandwidth available, the internet aware facsimile device can switch to pass through facsimile communications.

For example, an impairments probing method can dynamically automatically configure an internet aware facsimile device. This can allow users to use the internet aware facsimile device at high speed most of the time when impairments on the network are below a threshold. If the impairments go above the threshold, the internet aware facsimile device can reconfigure to a slower and more robust speed, such as T38, to handle facsimile calls without failure. This can give users the opportunity to make high speed facsimile communication calls when the network is reasonably calm and, if anything causes the network to be disturbed by high impairments, the facsimile communication calls can be sent at a slower and more robust speed.

A probing software algorithm running on an internet aware facsimile device can have a ping oriented probing capability by sending an echo request to a target device. The probe can poll all of the aspects of the network status to measure throughput impairments, such as packet loss, delay, and jitter. The measured impairment level can be used to determine the facsimile transmission protocol configuration for the internet aware facsimile device. An accumulated and calculated correlated output can be used for the configuration. If the measured impairments are very low, such on as a virtually clean network, the facsimile communications can go through using a G711 pass through protocol, such as a V34 mode, up to 33.6 kbps. If the measured impairments are reasonably high, such as mild impairments, the facsimile communications can go through using a T38 protocol, such as a V17 mode, up to 14.4 kbps. If the measured impairments are high, the facsimile communication can go through using a T38 redundancy mode protocol, such as V17 mode, up to 14.4 kbps, but more robust than the previous two protocols.

Figure 2:
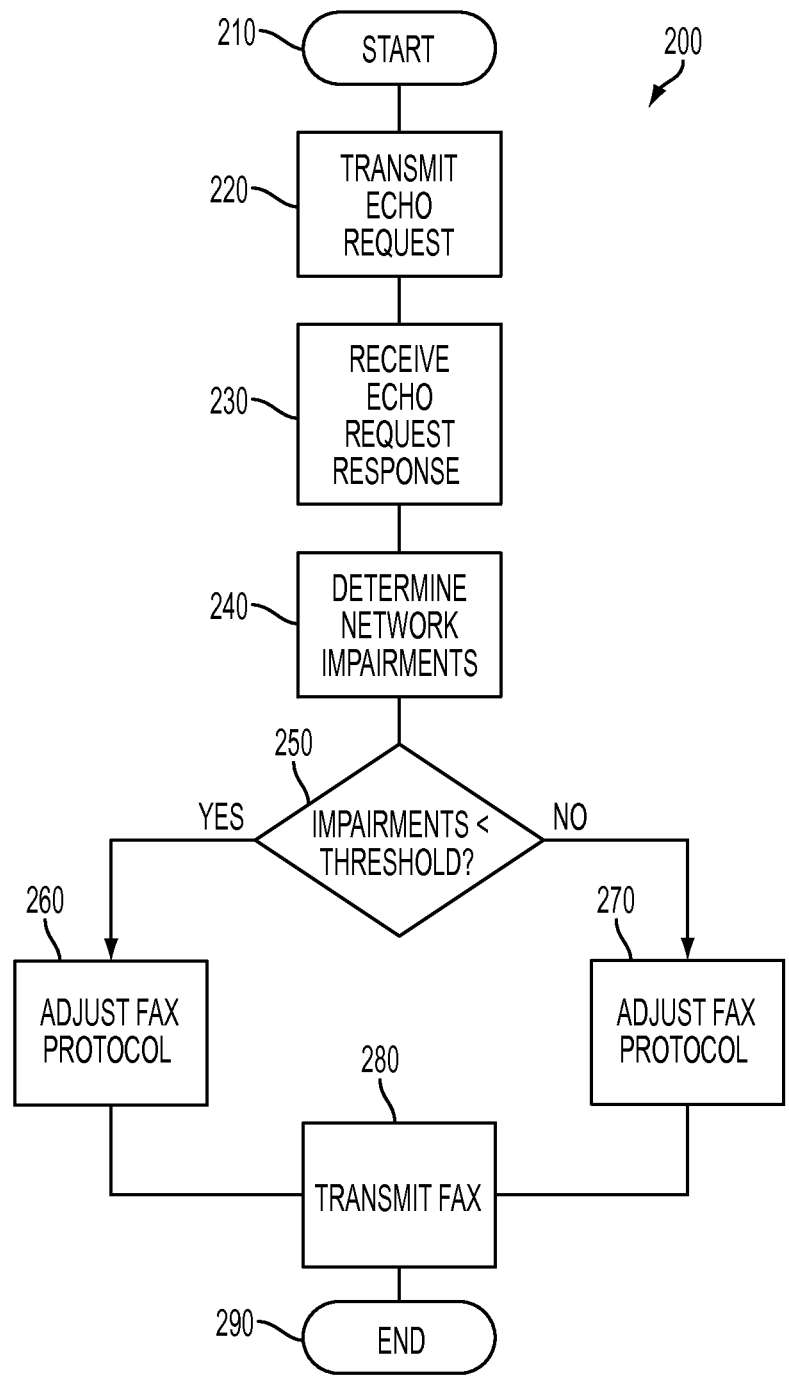
FIG. 2 illustrates an exemplary flowchart of a method of configuring a facsimile transmission protocol for an internet aware facsimile device.

FIG. 2 illustrates an exemplary flowchart 200 of a method of configuring a facsimile transmission protocol for an internet aware facsimile device, such as the facsimile device 110. The method starts at 210. At 220, an echo request can be transmitted via a network connection to another facsimile device. For example, an internet information request message or other ping-type message can be transmitted via the network connection to the another facsimile device. At 230, a response to the echo request can be received via the network connection from the another facsimile device. At 240, network throughput impairments can be determined based on the received response to the echo request. For example, the network throughput impairments can be determined based on packet loss, based on packet delay, based on packet jitter, based on available bandwidth, and/or based on other network throughput impairments based on the received response to the echo request.

At 250, the determined network throughput impairments can be compared to a threshold. At 260, if the network throughput impairments are substantially below a threshold, a facsimile transmission protocol can be adjusted by implementing a faster facsimile transmission protocol. For example, a facsimile pass through transmission protocol can be implemented if the network throughput impairments are substantially below the threshold. At 270, if the network throughput impairments are substantially above a threshold, a facsimile transmission protocol can be adjusted by implementing a slower and more robust facsimile transmission protocol relative to the faster facsimile transmission protocol. For example, a T38 facsimile transmission protocol can be implemented if the network throughput impairments are substantially above the threshold. Furthermore, the facsimile transmission protocol can default to a T38 facsimile transmission protocol unless the determined network throughput impairments are substantially below a threshold. At 280, a facsimile message can be transmitted based on the adjusted facsimile transmission protocol. At 290, the method can end. According to some embodiments, all of the blocks of the flowchart 200 are not necessary. Additionally, the flowchart 200 or blocks of the flowchart 200 may be performed numerous times, such as iteratively. For example, the flowchart 200 may loop back from later blocks to earlier blocks.

Figure 3:
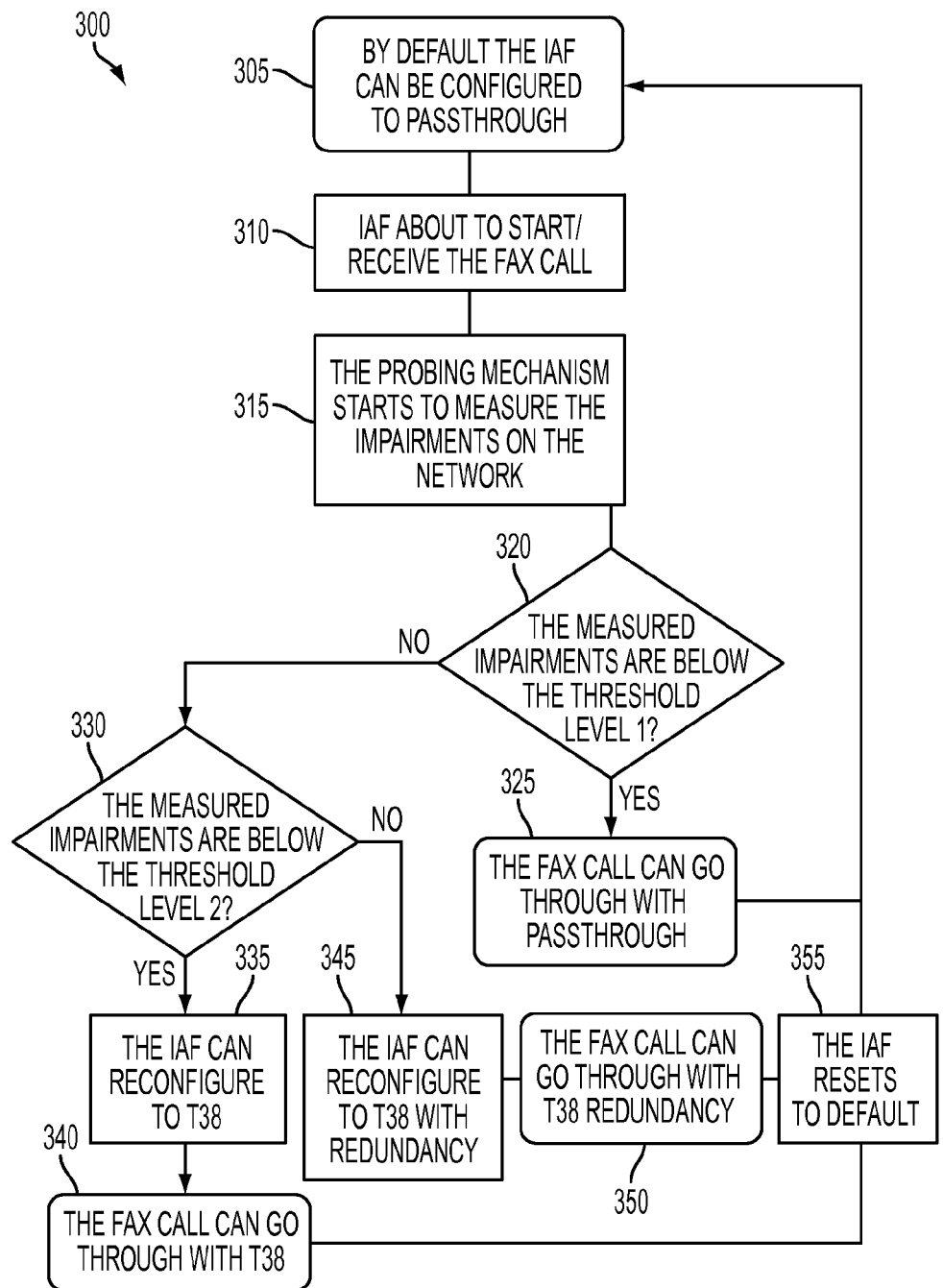
FIG. 3 illustrates an exemplary flowchart of a method of configuring a facsimile transmission protocol for an internet aware facsimile device.

FIG. 3 illustrates an exemplary flowchart 300 of a method of configuring a facsimile transmission protocol for an internet aware facsimile device, such as the facsimile device 110. Different blocks of the flowchart 300 can be added to or exchanged with blocks of the flowchart 200 and vice versa. At 305 the internet aware facsimile device can be configured to a pass through facsimile transmission protocol by default. At 310, the internet aware facsimile device can be ready to start or receive a facsimile message communication. At 315, a probing mechanism can measure or determine impairments on a network, such as by transmitting an echo request. At 320, a determination can be made as to whether the measured impairments are below a first threshold level. If so, at 325, a facsimile message can be transmitted using the pass through facsimile communication protocol. If not, at 330, a determination can be made as to whether the measured impairments are below a second threshold level that is above the first threshold level. If so, at 335, the internet aware facsimile device can reconfigure to implement a T38 facsimile communication protocol. At 340, the facsimile message can be transmitted using the T38 facsimile communication protocol. If the measured impairments are not substantially below the second threshold level, at 345, the internet aware facsimile device can reconfigure to implement a T38 with redundancy communication protocol. At 350, the facsimile message can be transmitted using the T38 with redundancy facsimile communication protocol. At 355, the internet aware facsimile device can return to the default facsimile communication protocol setting.

Thus, in the flowchart 300, determined network throughput impairments can be compared to a first threshold and compare to a second threshold, where the second threshold is above the first threshold. A facsimile transmission protocol can be adjusted by implementing a higher speed facsimile transmission protocol if the network throughput impairments are substantially below the first threshold, by implementing a first lower speed facsimile transmission protocol slower and more robust than the higher speed facsimile transmission protocol if the network throughput impairments are substantially above the first threshold and substantially below the second threshold, and by implementing a second lower speed facsimile transmission protocol more robust than the first lower speed facsimile transmission protocol if the network throughput impairments are above the second threshold. The higher speed facsimile transmission protocol can be a pass through facsimile transmission protocol, wherein the first lower speed facsimile transmission protocol can be a T38 facsimile transmission protocol, and wherein the second lower speed facsimile transmission protocol can be a T38 with redundancy facsimile transmission protocol.

Embodiments may be implemented on a programmed processor. However, the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the embodiments. For example, one of ordinary skill in the art of the embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method in an internet aware facsimile device including a network connection and a facsimile device controller, the method comprising:
   transmitting an echo request via the network connection to another facsimile device;
   receiving a response to the echo request via the network connection from the another facsimile device;
   determining network throughput impairments based on the received response to the echo request;
   adjusting a facsimile transmission protocol based on the determined network throughput impairments;
   transmitting a facsimile message based on the adjusted facsimile transmission protocol;
   comparing the determined network throughput impairments to a first threshold; and
   comparing the determined network throughput impairments to a second threshold, where the second threshold is above the first threshold,
   wherein adjusting the facsimile transmission protocol includes
      implementing a higher speed facsimile transmission protocol if the network throughput impairments are substantially below the first threshold,
      implementing a first lower speed facsimile transmission protocol slower and more robust than the higher speed facsimile transmission protocol if the network throughput impairments are substantially above the first threshold and substantially below the second threshold, and
      implementing a second lower speed facsimile transmission protocol more robust than the first lower speed facsimile transmission protocol if the network throughput impairments are substantially above the second threshold.

2. The method according to claim 1, further comprising comparing the determined network throughput impairments to a threshold,
   wherein adjusting the facsimile transmission protocol comprises adjusting the facsimile transmission protocol based on comparing the determined network throughput impairments to the threshold.

3. The method according to claim 1, further comprising comparing the determined network throughput impairments to a threshold,
   wherein adjusting the facsimile transmission protocol comprises implementing a faster facsimile transmission protocol if the network throughput impairments are substantially below the threshold and implementing a slower and more robust facsimile transmission protocol relative to the faster facsimile transmission protocol if the network throughput impairments are substantially above the threshold.

4. The method according to claim 1,
   wherein the higher speed facsimile transmission protocol comprises a pass through facsimile transmission protocol,
   wherein the first lower speed facsimile transmission protocol comprises a T38 facsimile transmission protocol, and
   wherein the second lower speed facsimile transmission protocol comprises a T38 with redundancy facsimile transmission protocol.

5. The method according to claim 1, further comprising comparing the determined network throughput impairments to a threshold,
   wherein adjusting the facsimile transmission protocol comprises implementing a facsimile pass through transmission protocol if the network throughput impairments are substantially below the threshold and implementing a T38 facsimile transmission protocol if the network throughput impairments are substantially above the threshold.

6. The method according to claim 1, further comprising comparing the determined network throughput impairments to a threshold,
   wherein adjusting the facsimile transmission protocol comprises defaulting the facsimile transmission protocol to a T38 facsimile transmission protocol unless the determined network throughput impairments are substantially below a threshold.

7. The method according to claim 1, wherein transmitting an echo request comprises transmitting an internet information request message via the network connection to the another facsimile device.

8. The method according to claim 1, wherein determining network throughput impairments comprises determining at least one of packet loss, packet delay, packet jitter, and available bandwidth based on the received response to the echo request.

9. The method according to claim 1,
   wherein the network connection comprises a connection configured to send and receive packet data, and
   wherein transmitting comprises transmitting a facsimile message based on the adjusted facsimile transmission protocol over the connection configured to send and receive packet data.

10. An apparatus for internet aware source facsimile communications, the apparatus comprising:
    a network connection;
    a facsimile device controller configured to control operations of the apparatus and configured to send and receive communications over the network connection; and
    a facsimile communication adjustment module configured to transmit an echo request over the network connection to a target facsimile device, configured to receive a response to the echo request via the network connection from the target facsimile device, configured to determine network throughput impairments based on the received response to the echo request, and configured to adjust a facsimile transmission protocol based on the determined network throughput impairments, wherein the facsimile device controller is configured to transmit a facsimile message based on the adjusted facsimile transmission protocol, and wherein the facsimile communication adjustment module is configured to compare the determined network throughput impairments to a first threshold, compare the determined network throughput impairments to a second threshold, where the second threshold is above the first threshold, and adjust the facsimile transmission protocol by implementing a higher speed facsimile transmission protocol if the network throughput impairments are substantially below the first threshold, by implementing a first lower speed facsimile transmission protocol slower and more robust than the higher speed facsimile transmission protocol if the network throughput impairments are substantially above the first threshold and substantially below the second threshold, and by implementing a second lower speed facsimile transmission protocol more robust than the first lower speed facsimile transmission protocol if the network throughput impairments are substantially above the second threshold.

11. The apparatus according to claim 10, wherein the facsimile communication adjustment module is configured to compare the determined network throughput impairments to a threshold and configured to adjust the facsimile transmission protocol based on comparing the determined network throughput impairments to the threshold.

12. The apparatus according to claim 10, wherein the facsimile communication adjustment module is configured to compare the determined network throughput impairments to a threshold and configured to adjust the facsimile transmission protocol by implementing a faster facsimile transmission protocol if the network throughput impairments are substantially below the threshold and by implementing a slower and more robust facsimile transmission protocol relative to the faster facsimile transmission protocol if the network throughput impairments are substantially above the threshold.

13. The apparatus according to claim 10, wherein the facsimile communication adjustment module is configured to compare the determined network throughput impairments to a threshold and adjust the facsimile transmission protocol by implementing a facsimile pass through transmission protocol if the network throughput impairments are substantially below the threshold and implementing a T38 facsimile transmission protocol if the network throughput impairments are substantially above the threshold.

14. The apparatus according to claim 10, wherein the facsimile communication adjustment module is configured to compare the determined network throughput impairments to a threshold and adjust the facsimile transmission protocol by defaulting the facsimile transmission protocol to a T38 facsimile transmission protocol unless the determined network throughput impairments are substantially below a threshold.

15. The apparatus according to claim 10, wherein the facsimile communication adjustment module is configured to transmit the echo request by transmitting an internet information request message via the network connection to the target facsimile device.

16. The apparatus according to claim 10,
wherein the network connection comprises a connection configured to send and receive packet data, and
wherein the facsimile communication adjustment module is configured to transmit the facsimile message based on the adjusted facsimile transmission protocol over the connection configured to send and receive packet data.

* * * * *